May 11, 1948.     G. E. KING     2,441,155
CONTROL FOR ELECTRIC WORK AND FEED MOTORS
Filed May 7, 1946
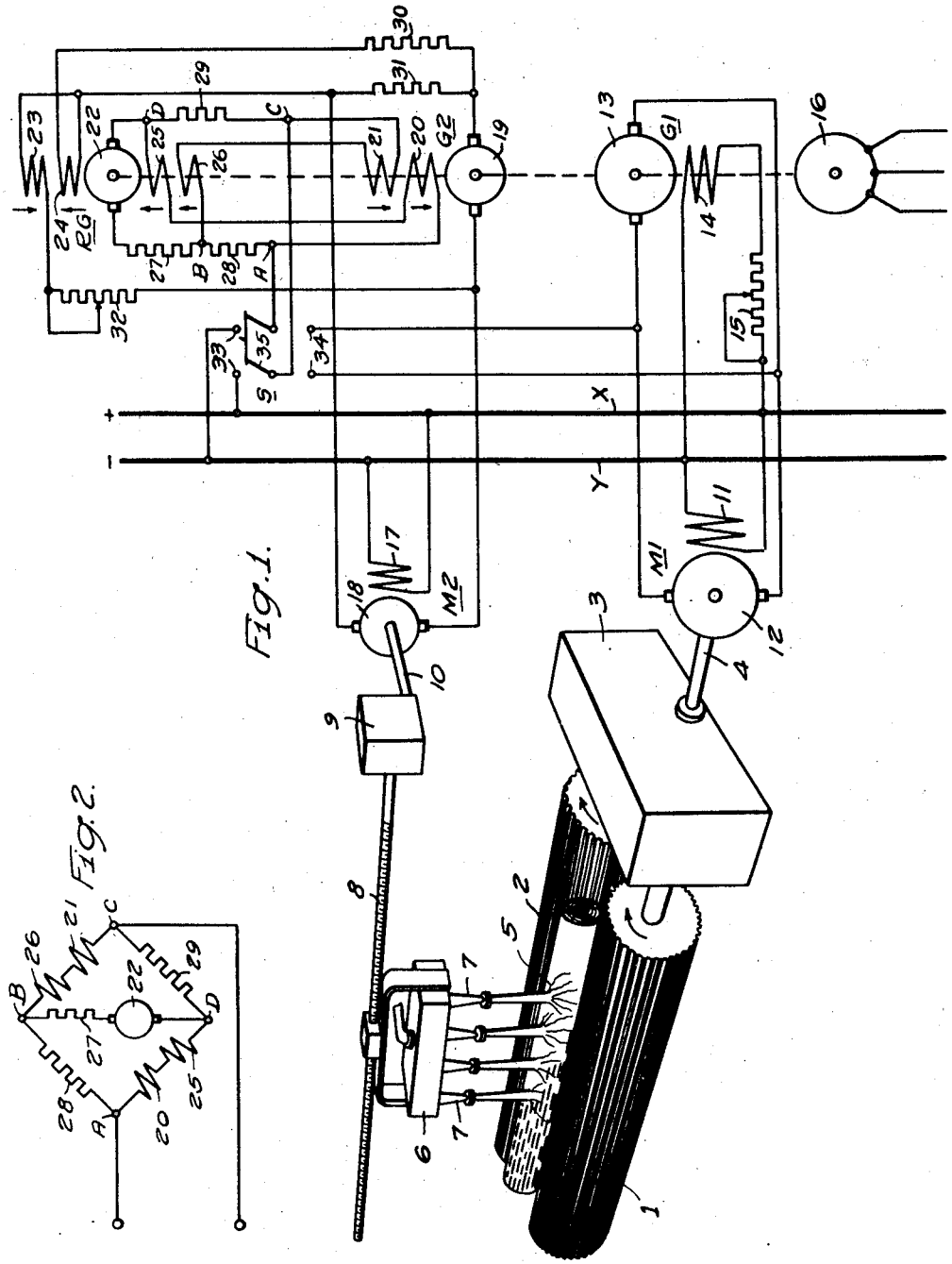
WITNESSES:
INVENTOR
George E. King.
BY
Paul C. Friedemann
ATTORNEY Patented May 11, 1948

2,441,155

UNITED STATES PATENT OFFICE 2,441,155

CONTROL FOR ELECTRIC WORK AND FEED MOTORS

George E. King, Swissvale, Pa., assignor to Westinghouse Electric Corporation, East Pittsburgh, Pa., a corporation of Pennsylvania Application May 7, 1946, Serial No. 667,764

9 Claims. (Cl. 318—39)

My invention relates to electric drive systems for machinery in which the speed of a first motor is adjustable within a given range while another motor is automatically regulated to operate in a fixed speed relationship to the first motor, this relationship being also adjustable between minimum and maximum limits. Such drive systems are required, for instance, for machine tools such as boring mills where the rate of tool feed is expressed in inches per revolution of the workpiece or for hydraulic log barkers where the rate at which the nozzles for ejecting bark-removing jets of water are to move along the log in a fixed speed relation to the revolving speed of the log.

It is an object of the invention to provide a control system for co-ordinated drive motors of the type mentioned that permits adjusting the speed of the first motor and offers a wide range of adjustment for the speed ratio to be maintained by the second motor while employing for this purpose a variable voltage system of relatively simple design, reliable operation, and high accuracy and constancy of regulation.

One of the more specific objects of the invention, relating to log barking machines, is to provide a control system capable of varying the speed of the automatically regulated motor over an extremely wide range such as a range of fifty to one in order to secure a satisfactory constancy of the desired speed ratio under virtually all expectable varieties of working conditions.

These and other objects, as well as the means provided by the invention for achieving them, will be apparent from the following description of the embodiment illustrated in the drawing.

Figure 1 of the drawing shows schematically a log barking machine in conjunction with an electric drive and control system according to the invention, while Fig. 2 is a straight-line circuit diagram of part of the system according to Fig. 1.

The illustrated log barking machine has two rolls 1 and 2 which are driven through a gear box 3 by the shaft 4 of an electric motor M1, both rolls revolving in the same direction. The log 5 rests on the rolls and is rotated by the rolls so that the peripheral speed is the same for logs of different diameters. A carriage 6 for a group of nozzles 7 is movable along the log. The nozzles are supplied with water under high pressure so that the bark is blasted away from the log as the carriage 6 travels along its working stroke. A feed screw 8 for moving the carriage 6 is driven through a gear box 9 by the shaft 10 of another electric motor M2.

The speed of motor M2 must be a function of the speed of motor M1, since the feed motion of the nozzle carriage for best performance should be a given value in feet per revolution of the log. The speed at which the bark can be removed varies with different seasons of the year and with different kinds of trees. It is therefore desirable to change the speed of revolution of the logs over a range of, for instance, 5 to 1. Since the logs vary in diameter 10 to 1, it is necessary to vary the speed of the motor M2 within a corresponding range of 10 to 1. For instance, if it is desired to feed the nozzle carriage at the rate of 2 feet per revolution of the log, then for a log 8 inches in diameter the feed motor M2 must operate at ten times the speed required for a log of 80 inches diameter. Since the driving speed of the carriage must operate over a range of 5 to 1 as the speed of the rolls is changed, and over a range of 10 to 1 for different log diameters, the speed of the feed motor M2 must be capable of varying over a total range of 50 to 1 in order to afford the desired constancy of speed regulation under the variety of the above mentioned operating conditions.

The electric control system for the two drive motors shown in the drawing is capable, by virtue of the invention, to satisfy such extreme conditions with the aid of relatively simple and reliable electric equipment.

As shown in Fig. 1, the motor M1 has a field winding 11 supplied with constant excitation from direct-current mains X and Y which may be energized from an exciter generator or from some other suitable source of substantially constant direct-current voltage.

The armature 12 of motor M1 is energized by variable voltage from the armature 13 of a generator G1. The field winding 14 of this generator is connected across mains X and Y through a rheostat 15 which permits varying the generator excitation, and hence its output voltage and the speed of motor M1, within the desired range of control, for instance, in accordance with a speed range of 5 to 1 for motor M1. In other words, the speed adjusting rheostat 15 permits selecting the rate of barking in accordance with the particular kind of logs fed into the barking machine. The armature 13 of generator G1 is driven at substantially constant speed by an auxiliary motor 16.

The feed motor M2 has its field winding 17 connected to the mains X and Y so that it operates under constant field excitation. Consequently, the speed of motor M2 depends on the voltage impressed on the motor armature 18. This voltage is generated in the armature 19 of another generator G2 which has two separately excited field windings 20 and 21. Windings 20 and 21 are connected for cumulative operation and have preferably equal ampere turns or resistance. The excitation of these windings is regulated by means of a regulating generator RG whose armature 22, together with armature 19 of generator G2, is mounted on the shaft of generator G1 in order to operate also at substantially constant speed.

Regulating generator RG has a voltage field winding 23 a current or compensating field winding 24, and two pattern field windings 25 and 26. Windings 24, 25 and 26 act cumulatively relative to one another, the resistances of windings 25 and 26 being preferably equal. The voltage field winding 23 acts differentially with respect to the resultant field (pattern field) of the three other windings, and is balanceable relative to the resultant pattern field. Three resistors 27, 28 and 29 are so connected with the regulator armature 22 and field windings 20, 21, 25 and 26 that these interconnected elements form a balanced bridge circuit of the type separately shown in Fig. 2.

This bridge circuit has four branches separated by the four diagonal points marked A, B, C, and D. Two opposite branches contain each a field winding 20 or 21 of generator G2, and a series connected pattern field winding 25 or 26 of generator RG. The resistors 28 and 29 are arranged in the two remaining bridge branches respectively. The bridge diagonal between points B and D contains in series the armature 22 of generator RG and the resistor 27. Since the bridge is balanced, the voltage generated in armature 22 and impressed across diagonal points D and B causes a current to flow through the field windings 20, 25 and 21, 26, thus exciting the generator G2 and the pattern field windings of generator RG accordingly. However, due to the bridge balance, this current produces no voltage difference between points A and C of the bridge. As will be shown later, another voltage is impressed across points A and C. This voltage causes a corresponding current to flow through the field windings of generator G2 and the pattern field windings of generator RG, thus superimposing another excitation on the one resulting from the voltage of armature 22. The second current produces no voltage drop between points D and B. Consequently, although the two field exciting effects are superimposed on each other within the field windings in the bridge circuit, they remain without effect on each other.

It will thus be understood that the pattern field windings 25 and 26 perform two mutually superimposed functions. In the first place, the pattern field windings are excited by the voltage (pattern voltage) separately impressed across bridge points A and C. Secondly, the pattern field windings are traversed by current generated in the armature 22 of the regulating generator and hence operate also as self-excited field windings. The magnetic circuit of the machine is designed to operate along the straight portion below the saturation point of the magnetic characteristic; and the resistor 27 in the armature diagonal of the bridge is so rated that the resistance or air gap line of the regulating generator coincides substantially with the straight portion of the magnetic characteristic. Under these conditions the self-exciting component of excitation impressed by the armature 22 on the pattern field windings 25 and 26 provides substantially all excitation needed for maintaining the generator voltage of armature 22 at any point along the straight portion of the magnetic characteristic. Consequently, the superimposed component excitation due to the pattern voltage across bridge points A and C is merely required to provide the slight stimulus or signal needed for shifting the voltage point in one direction or the other along the straight portion of the characteristic. In this manner, the regulating generator operates as a sensitive amplifier with a high amplification factor. That is, the regulating generator changes its armature voltage and hence the field excitation of the generator G2 in accordance with the pattern or signal voltage impressed across bridge points A and C but in a proportionately much larger extent. The resultant field of windings 25 and 26 is balanced by that of winding 23 at zero load.

The compensating field winding 24 of regulating generator RG is series connected with a calibrating resistor 30 across a current measuring resistor 31 that is series-connected between the armature 19 of generator G2 and the armature 18 of motor M2. The voltage drop obtaining across the resistor 31 changes in proportion to the load current of motor M2. The resistor 30 is so rated that the excitation of field winding 24 is proportional to the I. R. drop in the armature circuit of motor M2 in order to correct the resultant pattern field of the regulating generator for this I. R. drop. The pilot field winding 23 is connected across the armature 18 of motor M2 in series with an adjustable rheostat 32. Consequently the excitation of pilot field winding 23 is in accordance with the voltage impressed on the armature of motor M2 and hence changes in dependence upon the speed of motor M2 in a ratio determined by the selected setting of rheostat 32. The rheostat 32 thus permits adjusting the speed of motor M2 within a range of, for instance, 10 to 1 for any given speed of motor M1.

The diagonal points A and C of the above described bridge circuit are connected to a switch S. A pair of stationary contacts 33 of switch S is connected to the mains X and Y while another pair of stationary contacts 34 is connected across the armature 12 of motor M1. The movable contact assembly 35 of switch S permits connecting the bridge points A and C to either pair of stationary contacts. When the switch is set for connecting points A and C with contacts 34, the pattern voltage impressed on the bridge is in accordance with the voltage across the armature 12 of motor M1. Since this voltage is substantially proportional to the motor speed, the superimposed pattern excitation of the bridge circuit varies in accordance with this speed. When this pattern excitation just balances the opposing excitation of voltage field winding 23, that is, when the feed motor M2 is running at the correct speed, the voltage generated in armature 22 remains unchanged and provides the generator G2 with the field excitation needed to maintain the speed of motor M2 at a constant value. When the pattern field excitation departs from the balance value, the resultant field effect of the four windings in generator RG has a finite value and such a direction as to change the field excitation of generator G2 in the direction and by the amount needed to return the speed of motor M2 to the correct value. In this manner the control system operates to regulate motor M2 in accordance with the desired speed ratio selected by the chosen setting of rheostat 32. This rheostat may be calibrated directly in log diameters for instance, from 8 to 80 inches.

When the nozzle carriage has reached the end of its working travel, switch S is reversed so that it connects the diagonal points A and C with contacts 33. Then a constant pattern voltage of reversed polarity is impressed on the bridge circuit and causes the generator G2 to develop a reversed output voltage of high magnitude, thereby energizing the motor M2 for a high speed return movement of the carriage.

While I have described an embodiment of my invention in conjunction with a log barking machine, a similar system can also be employed for driving boring mills or other machine tools which require two motors to operate simultaneously at an adjustable speed and in an adjustable speed relationship to each other. It will further be understood by those skilled in the art that the control circuits according to the invention can be modified as to details of the component electric equipment and the component circuit connections without departing from the principles of the invention and within its essential features as set forth in the claims annexed hereto.

I claim as my invention:

1. An electric machinery drive, comprising a first motor, a first generator having an armature connected to said motor for providing variable voltage therefor and having field control means for controlling said voltage to operate said first motor at adjustable speed, a second motor to operate in a given speed relation to said first motor, a second generator having an armature connected to said second motor for providing energization therefor and field winding means for controlling said energization, a regulating generator having an armature connected to said field winding means for exciting the latter and having pattern field means and pilot field means for differentially controlling the excitation of said field winding means, circuit means for connecting said pattern field means to said first generator for exciting said pattern field means in accordance with said variable voltage, circuit means connecting said pilot field means to said second generator for exciting said pilot field means in accordance with said energization, an adjustable rheostat forming part of said latter circuit means for adjusting said speed relation, and means for driving said armatures of said three generators at substantially constant speed.

2. An electric machinery drive, comprising a first motor, a first generator having an armature connected to said motor for providing variable voltage therefor and having field control means for controlling said voltage to operate said first motor at adjustable speed, a second motor to operate in a given speed relation to said first motor, a second generator having an armature connected to said second motor for providing energization therefor and field winding means for controlling said energization, a regulating generator having an armature connected to said field winding means for exciting the latter and having pattern field means and pilot field means for differentially controlling the excitation of said field winding means, means for supplying a substantially constant voltage, reversing contacts for selectively connecting said pattern field means to said first generator and said voltage supply means in order to excite said pattern field means in accordance with said variable voltage during the working performance of the machinery and by constant voltage of reversed polarity during idle return performance of the machinery, and circuit means connecting said pilot field means to said second generator for exciting said pilot field means in accordance with said energization.

3. An electric machine tool drive, comprising a first motor, a first generator having an armature connected to said motor for providing variable voltage therefor and having a main field winding, means for supplying a substantially constant voltage connected to said main field winding, an adjustable rheostat interposed between said voltage supply means and said main field winding for controlling the excitation of the latter in order to adjust the speed of said first motor, a second motor to operate in a given speed relation to said first motor, a second generator having an armature connected to said second motor for providing energization therefor and field winding means for controlling said energization, a regulating generator having an armature connected to said field winding means for exciting the latter and having pattern field means and pilot field means for differentially controlling the excitation of said field winding means, reversing contacts for selectively connecting said pattern field means to said first generator and said voltage supply means in order to excite said pattern field means in accordance with said variable voltage during the working performance of the machine tool and by constant voltage of reversed polarity during idle return performance of the machine tool, and an adjustable rheostat forming part of said latter circuit means for adjusting said speed relation.

4. An electric drive, comprising a first motor, a first generator having an armature connected to said motor for providing variable voltage therefor and having field control means for controlling said voltage to operate said first motor at adjustable speed, a second motor to operate in a given speed relation to said first motor, a second generator having an armature connected to said second motor for providing energization therefor and having two cumulative field windings for controlling said energization, a regulating generator having an armature and two cumulative pattern field windings and having a pilot field winding for differential and balanceable action relative to said pattern field windings, two resistors connected with said two generator field windings and said two pattern field windings to form a balanced bridge circuit having two oppositely located branches each containing one of said generator field windings and one of said pattern field windings in series with each other and two remaining branches containing said resistors respectively, said bridge having two diagonal circuits of which one contains said armature of said regulating generator while the other is connected across said armature of said first generator whereby said pattern field windings receive excitation in accordance with said variable voltage and superimposed excitation by voltage generated in said armature of said regulating generator, and circuit means connecting said pilot field winding to said second generator for exciting said pilot field winding in accordance with said energization of said second motor.

5. A machine tool drive, comprising a first motor, a first generator having an armature connected to said motor for providing variable voltage therefor and having a main field winding, means for supplying a substantially constant voltage connected to said main field winding, an adjustable rheostat interposed between said voltage supply means and said main field winding for controlling the excitation of the latter in order to adjust the speed of said first motor, a second motor to operate in a substantially constant speed relation to said first motor, a second generator having an armature connected to said second motor for providing energization therefor and having two cumulative field windings for controlling said energization, a regulating generator having an armature and two cumulative pattern field windings and having a pilot field winding for differential and balanceable action relative to said pattern field windings, two resistors connected with said two generator field windings and said two pattern field windings to form a balanced bridge circuit having two oppositely located branches each containing one of said generator field windings and one of said pattern field windings in series with each other and two remaining branches containing said resistors respectively, said bridge having two diagonal circuits of which one contains said armature of said regulating generator while the other is connected across said armature of said first generator whereby said pattern field windings receive excitation in accordance with said variable voltage and superimposed excitation by voltage generated in said armature of said regulating generator, circuit means connecting said pilot field winding to said second generator for exciting said pilot field winding in accordance with said energization of said second motor, and an adjustable rheostat forming part of said latter circuit means for adjusting said speed relation.

6. A machine tool drive, comprising a first motor, a first generator having an armature connected to said motor for providing variable voltage therefor and having a main field winding, means for supplying a substantially constant voltage connected to said main field winding, an adjustable rheostat interposed between said voltage supply means and said main field winding for controlling the excitation of the latter in order to adjust the speed of said first motor, a second motor to operate in a substantially constant speed relation to said first motor, a second generator having an armature connected to said second motor for providing energization therefor and having two cumulative field windings for controlling said energization, a regulating generator having an armature and two cumulative pattern field windings and having a pilot field winding for differential and balanceable action relative to said pattern field windings, two resistors connected with said two generator field windings and said two pattern field windings to form a balanced bridge circuit having two oppositely located branches each containing one of said generator field windings and one of said pattern field windings in series with each other and two remaining branches containing said resistors respectively, said bridge having two diagonal circuits of which one contains said armature of said regulating generator, reversing contact means attached to said other diagonal circuit for connecting it selectively to said first generator and said voltage supply means in order to excite said pattern field windings in accordance with said variable voltage during the working performance of the machine tool and by constant voltage of reversed polarity during idle return performance of the machine tool, and circuit means connecting said pilot field winding to said second generator for exciting said pilot field winding in accordance with said energization of said second motor.

7. An electric drive, comprising a first motor, a first generator having an armature connected to said motor for providing variable voltage therefor and having field control means for controlling said voltage to operate said first motor at adjustable speed, a second motor to operate in a given speed relation to said first motor, a second generator having an armature connected to said second motor for providing energization therefor and having two cumulative field windings for controlling said energization, a resistor connected in series with said second motor and said armature of said second generator to develop a voltage drop in proportion to the current traversing said second motor, a regulating generator having an armature and two cumulative pattern field windings and a compensating field winding cumulative relative to said pattern field windings and a pilot field winding differential and balanceable relative to the totality of said pattern and compensating field windings, said compensating field winding being connected across said resistor, two resistors connected with said two generator field windings and said two pattern field windings to form a balanced bridge circuit having two oppositely located branches each containing one of said generator field windings and one of said pattern field windings in series with each other and two remaining branches containing said resistors respectively, said bridge having two diagonal circuits of which one contains said armature of said regulating generator while the other is connected across said armature of said first generator whereby said pattern field windings receive excitation in accordance with said variable voltage and superimposed excitation by voltage generated in said armature of said regulating generator, circuit means connecting said pilot field winding to said second generator for exciting said pilot field winding in accordance with said energization of said second motor.

8. With a machine tool having means for moving a workpiece in one direction and a working device movable at an angle to said direction, the combination of a first motor for driving said means, a second motor for moving said device in a constant speed relation to said means, a first generator having an armature connected to said first motor for providing variable voltage therefor and having field control means for controlling said voltage to operate said first motor at adjustable speed, a second generator having an armature connected to said second motor for providing energization therefor and having two cumulative field windings for controlling said energization, a regulating generator having an armature and two cumulative pattern field windings and having a pilot field winding for differential and balanceable action relative to said pattern field windings, two resistors connected with said two generator field windings and said two pattern field windings to form a balanced bridge circuit having two oppositely located branches each containing one of said generator field windings and one of said pattern field windings in series with each other and two remaining branches containing said resistors respectively, said bridge having two diagonal circuits of which one contains said armature of said regulating generator while the other is connected across said armature of said first generator whereby said pattern field windings receive excitation in accordance with said variable voltage and superimposed excitation by voltage generated in said armature of said regulating generator, circuit means connecting said pilot field winding to said second generator for exciting said pilot field winding in accordance with said energization of said second motor, an adjustable rheostat forming part of said latter circuit means for adjusting said speed relation, and an auxiliary motor mechanically connected to said armature of said three generators for driving them together.

9. With a log barking machine having log revolving means and a jet carrying device movable along the log, the combination of a first motor for driving said means, a second motor for moving said device in a constant speed relation to said means, a first generator having an armature connected to said first motor for providing variable voltage therefor and having field control means for controlling said voltage to operate said first motor at adjustable speed, a second generator having an armature connected to said second motor for providing energization therefor and field winding means for controlling said energization, a regulating generator having an armature connected to said field winding means for exciting the latter and having pattern field means and pilot field means for differentially controlling the excitation of said field winding means, means for supplying a substantially constant voltage, reversing contacts for selectively connecting said pattern field means to said first generator and said voltage supply means in order to excite said pattern field means in accordance with said variable voltage during the working stroke of said device and by constant voltage of reversed polarity during the return stroke of said device, circuit means connecting said pilot field means to said second generator for exciting said pilot field means in accordance with said energization, and an adjustable rheostat forming part of said latter circuit means for adjusting said speed relation.

GEORGE E. KING.